US009064111B2

(12) United States Patent
Aciicmez et al.

(10) Patent No.: US 9,064,111 B2
(45) Date of Patent: *Jun. 23, 2015

(54) SANDBOXING TECHNOLOGY FOR WEBRUNTIME SYSTEM

(75) Inventors: Onur Aciicmez, Santa Clara, CA (US); Andrew C. Blaich, Menlo Park, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/412,496

(22) Filed: Mar. 5, 2012

(65) Prior Publication Data
US 2013/0036448 A1 Feb. 7, 2013

Related U.S. Application Data

(60) Provisional application No. 61/514,856, filed on Aug. 3, 2011.

(51) Int. Cl.
*G06F 21/00* (2013.01)
*G06F 21/53* (2013.01)
*G06F 21/62* (2013.01)

(52) U.S. Cl.
CPC ............ *G06F 21/53* (2013.01); *G06F 21/6218* (2013.01); *G06F 21/629* (2013.01); *G06F 21/6281* (2013.01)

(58) Field of Classification Search
None
See application file for complete search history.

(56) References Cited

U.S. PATENT DOCUMENTS

| 7,127,605 | B1 |   | 10/2006 | Montgomery et al. |
| 7,350,204 | B2 | * | 3/2008  | Lambert et al. ............... 717/172 |
| 7,512,788 | B2 |   | 3/2009  | Choi et al. |
| 7,743,336 | B2 |   | 6/2010  | Louch et al. |
| 7,792,861 | B2 |   | 9/2010  | Kudoh et al. |
| 7,912,971 | B1 | * | 3/2011  | Dunn ............................ 709/229 |
| 7,945,774 | B2 |   | 5/2011  | Ganesan |
| 8,055,910 | B2 | * | 11/2011 | Kocher et al. .................... 726/21 |
| 8,104,077 | B1 | * | 1/2012  | Gauvin et al. ................... 726/12 |
| 8,140,650 | B2 | * | 3/2012  | Pulkkinen et al. ............. 709/220 |

(Continued)

FOREIGN PATENT DOCUMENTS

| CN | 101131718 A    | * | 2/2008  |           |
| KR | 1020090123587  | * | 12/2009 | H04W 88/02 |

OTHER PUBLICATIONS

Bouganim, "Dynamic Access-Control Policies on XML Encrypted Data", AMC Trans. Inf. Syst. Secur., 10(4): 1-37, 2008.*

(Continued)

*Primary Examiner* — Andrew Nalven
*Assistant Examiner* — Walter Malinowski
(74) *Attorney, Agent, or Firm* — Sherman IP LLP; Kenneth L. Sherman; Steven Laut

(57) ABSTRACT

In a first embodiment of the present invention, a method of providing security enforcements of widgets in a computer system having a processor and a memory is provided, comprising: extracting access control information from a widget process requesting a service, generating access control rules customized for the widget process, and providing the access control rules to a trusted portion of the computer system outside of the user code space of a Web Runtime (WRT) system; and for any static access control rule, delegating security checking of the widget process from the WRT system to the trusted portion of the computer system.

27 Claims, 12 Drawing Sheets

(56) References Cited

U.S. PATENT DOCUMENTS

| | | | |
|---|---|---|---|
| 8,151,340 B2 | 4/2012 | Nakata | |
| 8,272,065 B2 | 9/2012 | Persson et al. | |
| 8,566,910 B2 | 10/2013 | Laitinen et al. | |
| 8,850,573 B1* | 9/2014 | Chen et al. | 726/22 |
| 2003/0233544 A1* | 12/2003 | Erlingsson | 713/167 |
| 2004/0024764 A1* | 2/2004 | Hsu et al. | 707/9 |
| 2004/0187020 A1* | 9/2004 | Leerssen et al. | 713/200 |
| 2004/0210833 A1* | 10/2004 | Lerner et al. | 715/512 |
| 2004/0236747 A1* | 11/2004 | Swimmer et al. | 707/9 |
| 2005/0105497 A1* | 5/2005 | Belkin et al. | 370/338 |
| 2005/0120219 A1* | 6/2005 | Munetoh et al. | 713/176 |
| 2005/0191991 A1* | 9/2005 | Owen et al. | 455/411 |
| 2006/0137007 A1* | 6/2006 | Paatero et al. | 726/22 |
| 2007/0203881 A1* | 8/2007 | Schaad et al. | 707/1 |
| 2007/0204333 A1* | 8/2007 | Lear et al. | 726/6 |
| 2007/0256116 A1* | 11/2007 | Kerschbaum et al. | 726/1 |
| 2008/0009313 A1* | 1/2008 | Ishii | 455/556.1 |
| 2008/0046961 A1* | 2/2008 | Pouliot | 726/1 |
| 2008/0082627 A1* | 4/2008 | Allen et al. | 709/217 |
| 2008/0086643 A1* | 4/2008 | Balasubramanian et al. | 713/182 |
| 2008/0148283 A1* | 6/2008 | Allen et al. | 719/316 |
| 2008/0148298 A1 | 6/2008 | Chatterjee et al. | |
| 2008/0209535 A1* | 8/2008 | Athey et al. | 726/11 |
| 2008/0281798 A1* | 11/2008 | Chatterjee et al. | 707/3 |
| 2008/0294751 A1* | 11/2008 | Dreiling | 709/219 |
| 2009/0031355 A1* | 1/2009 | Gray et al. | 725/47 |
| 2009/0063691 A1* | 3/2009 | Kalofonos et al. | 709/229 |
| 2009/0111448 A1* | 4/2009 | Paila | 455/418 |
| 2009/0132949 A1* | 5/2009 | Bosarge | 715/777 |
| 2009/0138937 A1 | 5/2009 | Erlingsson et al. | |
| 2009/0248883 A1* | 10/2009 | Suryanarayana et al. | 709/229 |
| 2009/0254529 A1* | 10/2009 | Goldentouch | 707/3 |
| 2009/0271778 A1* | 10/2009 | Mandyam et al. | 717/171 |
| 2009/0282397 A1* | 11/2009 | Leporini et al. | 717/174 |
| 2010/0024009 A1* | 1/2010 | Comay et al. | 726/4 |
| 2010/0088739 A1* | 4/2010 | Hall et al. | 726/1 |
| 2010/0100929 A1* | 4/2010 | Bae et al. | 726/1 |
| 2010/0106977 A1 | 4/2010 | Persson et al. | |
| 2010/0138896 A1 | 6/2010 | Honda | |
| 2010/0146620 A1* | 6/2010 | Simeral et al. | 726/21 |
| 2010/0223658 A1* | 9/2010 | Narasimhan | 726/4 |
| 2010/0273486 A1* | 10/2010 | Kharia et al. | 455/436 |
| 2011/0119737 A1* | 5/2011 | Wen et al. | 726/3 |
| 2011/0138376 A1* | 6/2011 | Kim et al. | 717/173 |
| 2011/0173602 A1* | 7/2011 | Togami et al. | 717/173 |
| 2011/0231378 A1* | 9/2011 | Seo et al. | 707/694 |
| 2012/0136936 A1* | 5/2012 | Quintuna | 709/204 |
| 2012/0232973 A1* | 9/2012 | Robb et al. | 705/14.17 |
| 2012/0233560 A1* | 9/2012 | Schneider et al. | 715/765 |
| 2013/0030956 A1* | 1/2013 | Kim | 705/26.35 |
| 2013/0097654 A1* | 4/2013 | Aciicmez et al. | 726/1 |
| 2014/0032722 A1* | 1/2014 | Snow | 709/220 |

OTHER PUBLICATIONS

Goncalves, ""How about an App Store?" Enablers and Constraints in Platform Strategies for Mobile Network Operators", Mobile Business and 2010 Ninth Global Mobility Roundtable (ICMB-GMR), 2010 Ninth International Conference on, Jun. 13-15, 2010, pp. 66-73.*

Mukhija, Arun, "CASA—A Framework for Dynamically Adaptive Applications", Doctoral Thesis, University of Zurich, Dec. 2007, 217 pages.*

Widgets 1.0 Requirements, W3C Working Draft, Feb. 9, 2007, W3C, 2006, 22 pages.*

Hassinen, Marja, "Trustworthy Widget Sharing", HIIT Technical Reports 1010-3, 2010, 128 pages.*

Buecker, "IBM Tivoli Security Policy Manager", IBM Corporation, 2009, IBM red book, pp. 1-30.*

International Search Report dated Jan. 29, 2013 for International Application No. PCT/KR2012/006097 from Korean Intellectual Property Office, 3 pages, Seo-gu, Daejeon, Republic of Korea.

U.S. Non-Final Office Action for U.S. Appl. No. 13/274,061 mailed Dec. 16, 2013.

U.S. Notice of Allowance for U.S. Appl. No. 13/274,061 mailed Jul. 17, 2014.

* cited by examiner

| Author Signature | Distributor Signature | | | | | | | |
|---|---|---|---|---|---|---|---|---|
| | WAC Distributor Signature | | | | Priority Distributor Signature present (i.e., Operator)* | | | |
| | YES | NOT PRESENT | NOT VERIFIED / INVALID | REVOKED | YES | NOT VERIFIED / INVALID | | REVOKED |
| | | | | | | WAC Signed | Not WAC signed | |
| YES | Trusted, Recognized | Untrusted, Recognized | Untrusted, Recognized | Invalid (rejected) | Trusted, Recognized | Per WAC signature | Untrusted, Recognized | Invalid (rejected) |
| NOT PRESENT | Trusted, Unrecognized | Untrusted, Unrecognized | Untrusted, Unrecognized | Invalid (rejected) | Trusted, Unrecognized | Per WAC signature | Untrusted, Unrecognized | Invalid (rejected) |
| NOT VERIFIED / SELF | Trusted, Unrecognized | Untrusted, Unrecognized | Untrusted, Unrecognized | Invalid (rejected) | Trusted, Unrecognized | Per WAC signature | Untrusted, Unrecognized | Invalid (rejected) |
| REVOKED | Invalid (rejected) | Invalid (rejected) | Invalid (rejected) | Invalid (rejected) | Invalid (rejected) | Invalid (rejected) | Invalid (rejected) | Invalid (rejected) |

YES: Signature present and verified
NOT PRESENT: Signature not present
NOT VERIFIED: Signature present but unverifiable
INVALID: Signature present but incorrect
SELF: Self signed
* Priority (Operator) Distributor Signature assumed to be present as the first Distributor Signature (ahead of WAC or any others) [SP-2110]

WRT domain determinations:
- WAC Domain / WAC trusted channel only
- Operator Domain / WAC trusted channel only
- Untrusted Domain / side-loading only
- Trusted channel / trust-inhibiting conditions
- Widget Blocked from being installed / Executed

** Recognizes 3 types of identities:
1) WAC-assigned individual identity
2) WAC-verified domain identity
3) Extended validation domain identity

FIG. 4

SANDBOXING TECHNOLOGY FOR WEBRUNTIME SYSTEM

CROSS REFERENCE TO RELATED APPLICATIONS

This application claims the benefit of priority under 35 U.S.C. §119(e) to U.S. Provisional Patent Application No. 61/514,856, filed on Aug. 3, 2011, which is incorporated herein by reference in its entirety for all purposes.

BACKGROUND OF THE INVENTION

1. Field of the Invention

The present invention relates generally to improving the security of a webruntime system. More specifically, the present invention relates to using sandboxing technology to improve the security of a webruntime system.

2. Description of the Related Art

A widget (also commonly referred to as a web widget) is an interactive single purpose application for displaying and/or updating local data or data on the Web, packaged in a way to allow a single download and installation on a user's machine or mobile device. Widgets are client-side applications that may be authored using web standards and packaged for distribution. They may be downloaded and installed on client machines. A widget may run as a stand-alone application (meaning it can run outside of a Web browser). Widgets are downloadable applications commonly written using HTML, JavaScript, and CSS and utilize web technologies and standards.

The runtime environment in which a widget is run is referred to as a widget user agent or the Web Runtime System (WRT). The WRT is responsible for installation/de-installation of widgets, and to provide functionality for invocation and configuration of the widgets. The WRT is also responsible for the execution of widgets. For example, web widgets are typically written in JavaScript, which is an independent language. The WRT contains a software module, known as a JavaScript engine, to interpret the widget's JavaScript code and perform the execution.

FIG. 1 illustrates an example of a simplified high level architecture diagram of a WRT based on the Limo™ platform (i.e., Linux™ based mobile phone platforms). In this example, at the User Interface (UI) layer, the widgets may perform functions such as providing weather information, a clock, or a photo viewer. There is a Web Runtime UI. At the engine layer, there is a widget engine and a widget manager. At the core layer, there is a Webkit. The Webkit is a library used in Web engines. The WRT is the collection of all components, over and above the Web Engine at the core layer, needed to support installed widgets.

A widget package is a package, conforming to specific standards (e.g. See "Widgets: Packaging and Configuration specification", W3C Proposed Recommendations, 11 Aug. 2011, published by W3C, the World Wide Web Consortium), containing various files (including configuration documents, icons, digital signatures, etc.) that constitute the implementation of a widget. A widget package contains metadata, which will be referred to in this patent application as the manifest file, for the associated widget. A manifest file specifies a multitude of things of which include the access restrictions for a widget. The access restrictions are used by the WRT to control accesses by a widget to device capabilities, network resources, file system, etc.

There are several different standards bodies that are setting slightly different specifications and standardizations for widgets and JavaScript APIs for widgets. These bodies setting specification for widgets include: W3C, WAC, JIL, BONDI, and Opera among others. As a result, there are different types of widgets and widget runtime systems. Although, the details of the specifications (e.g., how to specify access rights and the granularity of permissions) differ, the general security models and access control enforcement principles of these widget systems are very similar.

The access control enforcements in current WRT implementations are handled by the user-space code of the WRT in the same process that runs the widget itself. For example, these controls and enforcements are handled in Web Engine code as shown in FIG. 2 which shows an overall high level architecture of a BONDI widget implementation having access control features at the Web Engine level.

Referring to FIG. 3, the inventors of the present patent application have recognized that a security vulnerability in conventional WRT arises because the access control enforcement in current WRT implementations is handled by the user-space code of WRT, which is in the same process that runs the widget itself. For example, these controls and enforcements are handled in the Web Engine (e.g. Webkit) code. As illustrated in FIG. 3, a benign process with a legitimate access flow will go through security checks. However, a compromised process has a corrupted access flow that can result in bypassing the mentioned security checks.

Security controls in conventional WRTs are inherently vulnerable and can be bypassed via threats such as address space corruption and code injection. For example, a web engine may contain a bug that allows remote attackers or malicious widgets to inject and run arbitrary code or change the legitimate control flow in that web engine. As a result, an attacker/widget can bypass the security checks and access the restricted resources.

As an illustrative example, Safari™, the popular web browser has several vulnerability types that can result in bypassing security checks. Safari™ is based on the same web engine, called WebKit, which is used in many mobile platforms including iPhone™ and Android™platforms. These vulnerabilities include an execute code vulnerability, an overflow vulnerability, and a memory corruption vulnerability. Safari™ is based on the same Webkit web engine used in many mobile platforms. Thus, there are significant security concerns associated with conventional WRT security controls.

Wholesale Application Community (WAC) defines JavaScript APIs for accessing the device capabilities. The WAC specification is derived from and influenced by earlier specification efforts, such as JIL, BONDI, and also W3C. The JIL and BONDI groups are already joined with WAC and all these efforts and operations are currently under the WAC umbrella now.

WAC APIs includes several methods and properties that are grouped into different modules:

- The accelerometer module API that allows using the device accelerometer sensor.
- The orientation module API that allows using the device orientation sensor.
- The camera module API that enables capturing media through the device camera.
- The devicestatus module API that provides access to the device status information.
- The filesystem module API that allows accessing the device file system.
- The messaging module API that allows message sending and retrieval.

The geolocation module API that exposes the device location (as specified in W3C).

The pim module API that exposes the different PIM (Personal Information Management) functionalities.

The contact module API that enables the management of contact information.

The calendar module API that enables the management of calendar information.

The task module API that enables the management of task information.

The deviceinteraction module API that enables the interaction with the end user through different device capabilities.

Accesses to the methods and properties of these modules are subject to different policy rules. WAC identifies some of these APIs as "restricted", also called "sensitive" functions, and accesses to these restricted APIs are controlled by WAC security framework and require user consent.

WAC defines three security domains: "trusted" (aka. WAC domain), "un-trusted" and "operator" (aka. WAC operator) domains. Applications are subject to different security rules depending on which domain they run in. WAC also makes use of a digital signature scheme and the domain of an application is determined based on its digital signature chain. The "operator" domain is intended for use by network service providers. An application runs in operator domain if it has a digital signature that originates from a WAC carrier, i.e., the root of the certificate chain of this application is an operator root certificate. An application runs in trusted domain if its certificate chains to a known WAC root certificate. Otherwise, if the application is not signed or the signature chain does not extend to a WAC root certificate, it runs in an un-trusted domain. FIG. 4 summarizes which domain a widget belongs to based on which conditions.

Accessing restricted APIs typically requires user confirmation due to security controls in place. For example, an application wishing to access a geolocation module API may require that the user provide permission for the application to access this API. This permission can be given on a temporary or a permanent basis. For example, WAC defines 5 different types of user confirmation requirements available for the security controls to place on these APIs:

Allowed: the function can be executing without prompting the user for confirmation One Shot: the user must be prompted every time to confirm that the function may be executed Session: the user must be prompted once per session (i.e., when widget is first added to active page) to confirm that the function may be executed Blanket: the user must be prompted for confirmation the first time that the API function is made by the widget, but once confirmed prompting is never again required.

Deny: is used by operators to indicate that the API function is never permitted.

Table 1 below depicts an example of restricted functions and their corresponding policy rules for each security domain. This table can be modified by operators to customize the experience. Moreover, users can also configure the policy and choose to use a policy that deviates from the default one provided by the operators.

TABLE 1

| Device Capability | Untrusted | WAC | WAC operator | Rationale ("textual interpretation") |
|---|---|---|---|---|
| accelerometer | Blanket Prompt | Permit | Permit | Abuse case: Privacy threat, as a widget can know if a device is moving, and expose that information though other APIs. |
| pim.calendar | One-Shot Prompt | Blanket Prompt | Permit | Applications in untrusted domain should not be offered with the opportunity to access these features without appropriate prompts. If developers want to enhance the user experience they can sign the widgets through WAC. |
| pim.calendar.read | One-Shot Prompt | Blanket Prompt | Permit | Applications in untrusted domain should not be offered with the opportunity to access these features without appropriate prompts. If developers want to enhance the user experience they can sign the widgets through WAC. |
| pim.calendarwrite | One-Shot Prompt | Blanket Prompt | Permit | Applications in untrusted domain should not be offered with the opportunity to access these features without appropriate prompts. If developers want to enhance the user experience they can sign the widgets through WAC. |
| camera | One-Shot Prompt | Blanket Prompt | Permit | Abuse case: audio and camera surveillance |
| camera.show | Permit | Permit | Permit | camera.show only adds the ability to attach the viewfinder to a window object, thus is not sensitive. |
| camera.capture | One-Shot Prompt | Blanket Prompt | Permit | Abuse case: audio and camera surveillance |
| pim.contact | One-Shot Prompt | Blanket Prompt | Permit | Applications in untrusted domain should not be offered with the opportunity to access these features without appropriate prompts. If developers want to enhance the user experience they can sign the widgets through WAC. |
| pim.calendar.read | One-Shot Prompt | Blanket Prompt | Permit | Applications in untrusted domain should not be offered with the opportunity to access these features without appropriate prompts. If developers want to enhance the |

TABLE 1-continued

| Device Capability | Untrusted | WAC | WAC operator | Rationale ("textual interpretation") |
|---|---|---|---|---|
| | | | | user experience they can sign the widgets through WAC. |
| pim.calendarwrite | One-Shot Prompt | Blanket Prompt | Permit | Applications in untrusted domain should not be offered with the opportunity to access these features without appropriate prompts. If developers want to enhance the user experience they can sign the widgets through WAC. |
| deviceinteraction | Permit | Permit | Permit | No significant abuse cases: at most an annoyance could be created by a widget that beeps the phone etc continuously or at inopportune times. |
| devicestatus | Session Prompt | Blanket Prompt | Permit | |
| XMLHttpReguest | Session Prompt | Blanket Prompt | Permit | Abuse case: Excessive network usage, or WARP-declared domains acting as a bridge to malware. Session Prompt is necessary since WAC has no control over the WARP declarations of untrusted widgets. |
| externalNetworkAccess | Session Prompt | Blanket Prompt | Permit | Abuse case: Excessive network usage, or WARP-declared domains acting as a bridge to malware. Session Prompt is necessary since WAC has no control over the WARP declarations of untrusted widgets. |
| filesystem | Permit conditionally With Deny fallback | Permit conditionally with Blanket Prompt fallback | Permit | Uncontrolled access to the device filesystem can lead to a variety of abuse cases. Widgets are always permitted to access their private storage areas in the filesystem. "Permit conditionally" means that if the widget is accessing its private storage, access is permitted. Otherwise the fallback action applies, e.g. access to other |
| filesystem.read | Permit conditionally With Deny fallback | Permit conditionally with Blanket Prompt fallback | Permit | Uncontrolled access to the device filesystem can lead to a variety of abuse cases. Widgets are always permitted to access their private storage areas in the filesystem. "Permit conditionally" means that if the widget is accessing its private storage, access is permitted. Otherwise the fallback action applies, e.g. access to other |
| filesystem.write | Permit conditionally With Deny fallback | Permit conditionally with Blanket Prompt fallback | Permit | Uncontrolled access to the device filesystem can lead to a variety of abuse cases. Widgets are always permitted to access their private storage areas in the filesystem. "Permit conditionally" means that if the widget is accessing its private storage, access is permitted. Otherwise the fallback action applies, e.g. access to other |
| messaging | One-Shot Prompt | Blanket Prompt | Permit | Provides access to all the messaging functionalities. |
| messaging.write | One-Shot Prompt | Blanket Prompt | Permit | Abuse case: excessive messaging, malware spreading, premium rate fraud |
| messaging.send | One-Shot Prompt | Blanket Prompt | Permit | Abuse case: excessive messaging, malware spreading, premium rate fraud |
| messaging.find | One-Shot Prompt | Blanket Prompt | Permit | Applications in untrusted domain should not be offered with the opportunity to access these features without appropriate Prompts. If developers want to enhance the user experience they can sign the widgets through WAC. |
| messaging.subscribe | One-Shot Prompt | Blanket Prompt | Permit | Applications in untrusted domain should not be offered with the opportunity to access these features without appropriate Prompts. If developers want to enhance the user experience they can sign the widgets through WAC. |
| orientation | Blanket Prompt | Permit | Permit | Abuse case: Privacy threat, as a widget can know if a device is moving, and expose that information though other APIs. |
| pim.task | One-Shot Prompt | Blanket Prompt | Permit | Applications in untrusted domain should not be offered with the opportunity to access these features without appropriate |

TABLE 1-continued

| Device Capability | Untrusted | WAC | WAC operator | Rationale ("textual interpretation") |
|---|---|---|---|---|
| pim.task.read | One-Shot Prompt | Blanket Prompt | Permit | Prompts. If developers want to enhance the user experience they can sign the widgets through WAC. Applications in untrusted domain should not be offered with the opportunity to access these features without appropriate Prompts. If developers want to enhance the user experience they can sign the widgets through WAC. |
| pim.task.write | One-Shot Prompt | Blanket Prompt | Permit | Applications in untrusted domain should not be offered with the opportunity to access these features without appropriate Prompts. If developers want to enhance the user experience they can sign the widgets through WAC. |

An application running within this framework is required to specify and describe in its metadata files (e.g., manifest, widget configuration document, etc.) which APIs and remote network resources it needs to access. These are known as dependencies. The [feature] and [iriset] attributes in metadata files can be used for this purpose. A WAC-capable device can display the statically expressed dependencies (e.g., APIs related to <feature element statements in the widget configuration document) of a widget prior to granting permission for the widget resource to be installed.

There are two main mechanisms in Linux to provide access control: DAC and MAC mechanisms.

In computer security, mandatory access control (MAC) refers to a type of access control by which the operating system constrains the ability of a subject or initiator to access or generally perform some sort of operation on an object or target. In practice, a subject is usually a process or thread; objects are constructs such as files, directories, TCP/UDP ports, shared memory segments, etc. Subjects and objects each have a set of security attributes. Whenever a subject attempts to access an object, an authorization rule enforced by the operating system kernel examines these security attributes and decides whether the access can take place. Any operation by any subject on any object will be tested against the set of authorization rules (aka policy) to determine if the operation is allowed.

With mandatory access control, this security policy is centrally controlled by a security policy administrator; users do not have the ability to override the policy and, for example, grant access to files that would otherwise be restricted. By contrast, discretionary access control (DAC), which also governs the ability of subjects to access objects, allows users the ability to make policy decisions and/or assign security attributes. (The traditional Unix system of users, groups, and read-write-execute permissions is an example of DAC.) MAC-enabled systems allow policy administrators to implement organization-wide security policies. Unlike with DAC, users cannot override or modify this policy, either accidentally or intentionally. This allows security administrators to define a central policy that is guaranteed (in principle) to be enforced for all users.

DAC mechanisms in current systems provide isolation for the assets of different users. Traditionally, computer systems are designed as multiuser systems. For example, a computer in a company or university can store assets (e.g. files, passwords, programs etc.) of different individuals and serve multiple users simultaneously (e.g. a file server). Traditional DAC (i.e., user/group permissions) determine which users can access which assets and thus provide user-level isolation.

In modern high-end mobile devices, which are indeed single user devices, DAC is used to provide isolation and sandboxing for applications. For example, in Android phones, each application is assigned a user id and runs as if it is a 'virtual user'. That way, the files that belong to different applications can have different DAC permissions and applications cannot access each other's files due to DAC isolation. Moreover, each application can be controlled to access a particular set of resources it is allowed to access. In Android, for example, when a new application is installed, the system shows the user a list of permissions the app requires and asks whether the user grants those permissions. If the permissions are granted, the system configures this app's DAC permissions in a way that allows the app to access only the resources or services specified by the permissions.

Similarly, a MAC mechanism, for example SMACK, can be used to provide app isolation and sandboxing in a mobile device. SMACK and SELinux are label based MAC mechanisms. We can assign specific (and possible unique) labels to applications and the resources in the system. SMACK and SELinux also use access control policies (i.e., list of access rules that specifies applications with which label can access resources of which label).

Similar to the DAC mechanism described above, it is possible to assign a different label to an application in a mobile phone and pass appropriate policy rules to the MAC mechanism to control which resources and services that application can access to. Based on the permissions granted by the user, a mobile phone system can configure the MAC labels and policy rules of a newly installed application.

In Linux, DAC and MAC are enforced on kernel space objects like files, sockets, directories, and devices. But in a complex system like a smart phone, there can be many objects that are defined in user space which cannot be controlled through DAC or MAC. These objects are created and controlled by processes such as system daemons, framework daemons, etc. If an application needs to access a user space object controlled by a daemon, it needs to send a request to this daemon to retrieve the object. To protect such user space objects, there must be a kind of credential to enforce access rights. A trusted entity should check if an application/process has the rights to access a user space object. In some cases, the daemon of a user space object can perform such security checks and enforcement. If an application and daemon use standard Linux IPC to directly communicate with each other, the daemon can check the credential and access rights of the requesting application, and thus there is no need to introduce a 3rd party process to perform security checks. However, in a smart phone, some services may use intermediary entities like D-bus for communication, service requests, etc. In such cases, the peer's credential is not automatically propagated to the other end of the communication channel and thus a 3rd party trusted entity, which we will call a "security server" in this document, is needed for access control purposes. Such a security server can hand out verifiable credentials to requesting processes and later on can verify the credentials on behalf of other processes that want to check the access rights of the requesting process. Such a scheme can use different form of credentials. In this document, for the sake of simplicity, we will consider a credential to be a random cookie (i.e., a random number) generated by the security server. An example operation flow is given in FIG. 5.

At 500, a cookie is requested by the application process. At 502, the security server retrieves the access rights of the application process and generates a random cookie, saving it along with the access rights. At 504, the security server sends a response to the application process. At 506, the application process requests service using the cookie from the service daemon. At 508, the service daemon asks for a privilege with the given cookie. At 510, the security server checks the privilege and at 512 the security server returns the result to the service daemon. At 512, the service daemon responds to the application process.

SUMMARY OF THE INVENTION

In a first embodiment of the present invention, a method of providing security enforcements of widgets in a computer system having a processor and a memory is provided, comprising: extracting access control information from a widget process requesting a service, generating access control rules customized for the widget process, and providing the access control rules to a trusted portion of the computer system outside of the user code space of a Web Runtime (WRT) system; and for any static access control rule, delegating security checking of the widget process from the WRT system to the trusted portion of the computer system.

In a second embodiment of the present invention, a method of providing security enforcements of widgets in a computer system having a processor and a memory is provided, comprising: extracting access control information from a widget process requesting a service, generating access control rules customized for the widget process, and providing the access control rules to a trusted portion of the computer system outside of the user code space of a Web Runtime (WRT) system; and for any static access control rule, delegating some but not all security checking of the widget process from the WRT system to the trusted portion of the computer system, such that two levels of security checking are performed, one by the WRT system and one by the trusted portion of the computer system.

In a third embodiment of the present invention, a computer system having improved widget security is provided, comprising: a processor; a memory; an operating system; and a Web Runtime (WRT) system supporting installation and invocation of widgets, the WRT system configured to receive a widget manifest from each installed widget and determine access control rules delegable from the WRT to a more security portion of the computer system associated with the operating system, the WRT system further configured to pass a set of delegable static access control rules to the more secure portion to perform security checking.

In a fourth embodiment of the present invention, a system is provided comprising: a plurality of widgets; a WRT management process; a security server; and an operating system kernel; wherein the WRT management process is configured to: extract access control information from the widgets, generate access control rules, and provide the access control rules to the operating system kernel; and for any static access control rule, delegate at least some security checking of the static access control rule to the operating system kernel.

In a fifth embodiment of the present invention, a program storage device readable by a machine tangibly embodying a program of instructions executable by the machine to perform a method providing security enforcements of widgets in a computer system having a processor and a memory is provided, the method comprising: extracting access control information from a widget process requesting a service, generating access control rules customized for the widget process, and providing the access control rules to a trusted portion of the computer system outside of the user code space of a Web Runtime (WRT) system; and for any static access control rule, delegating security checking of the widget process from the WRT system to the trusted portion of the computer system.

BRIEF DESCRIPTION OF THE DRAWINGS

FIG. 4 summarizes which domain a widget belongs to based on which conditions

DETAILED DESCRIPTION OF SPECIFIC EMBODIMENTS

Figure 1:
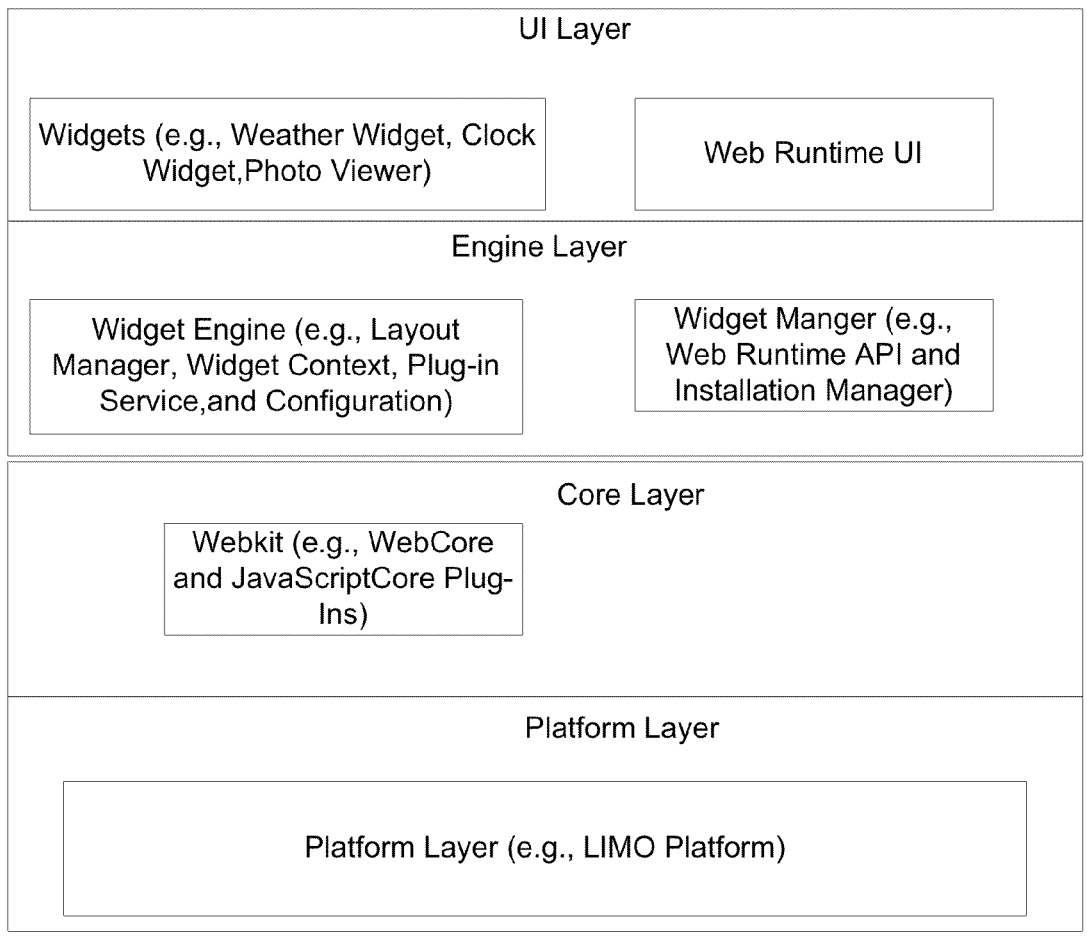
FIG. 1 illustrates an example of a simplified high level architecture diagram of a WRT based on the Limo™ platform (i.e., Linux™ based mobile phone platforms).
Figure 2:
FIG. 2 is a high level a high level architecture diagram illustrating portions of a prior art Web Runtime Architecture.
Figure 3:
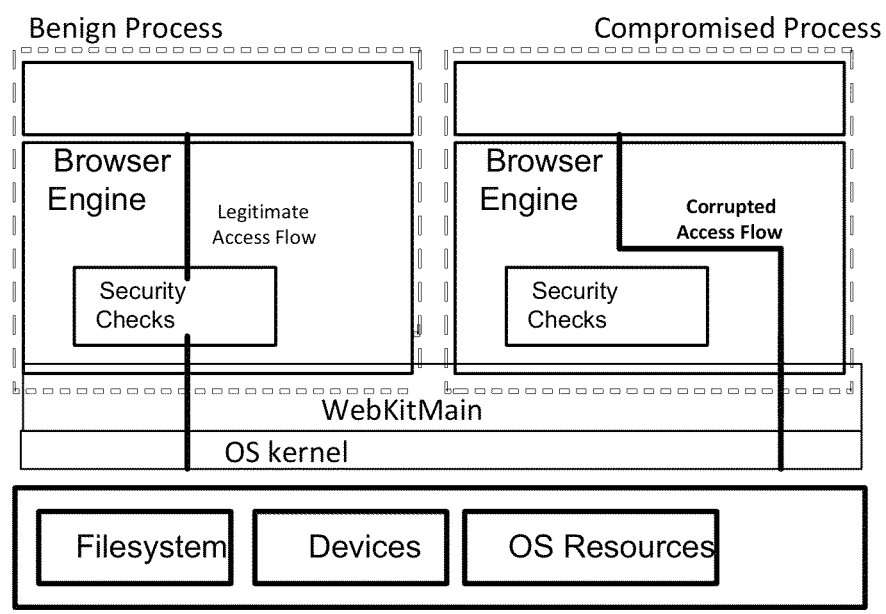
FIG. 3 illustrates widget security vulnerabilities in prior art systems.
Figure 5:
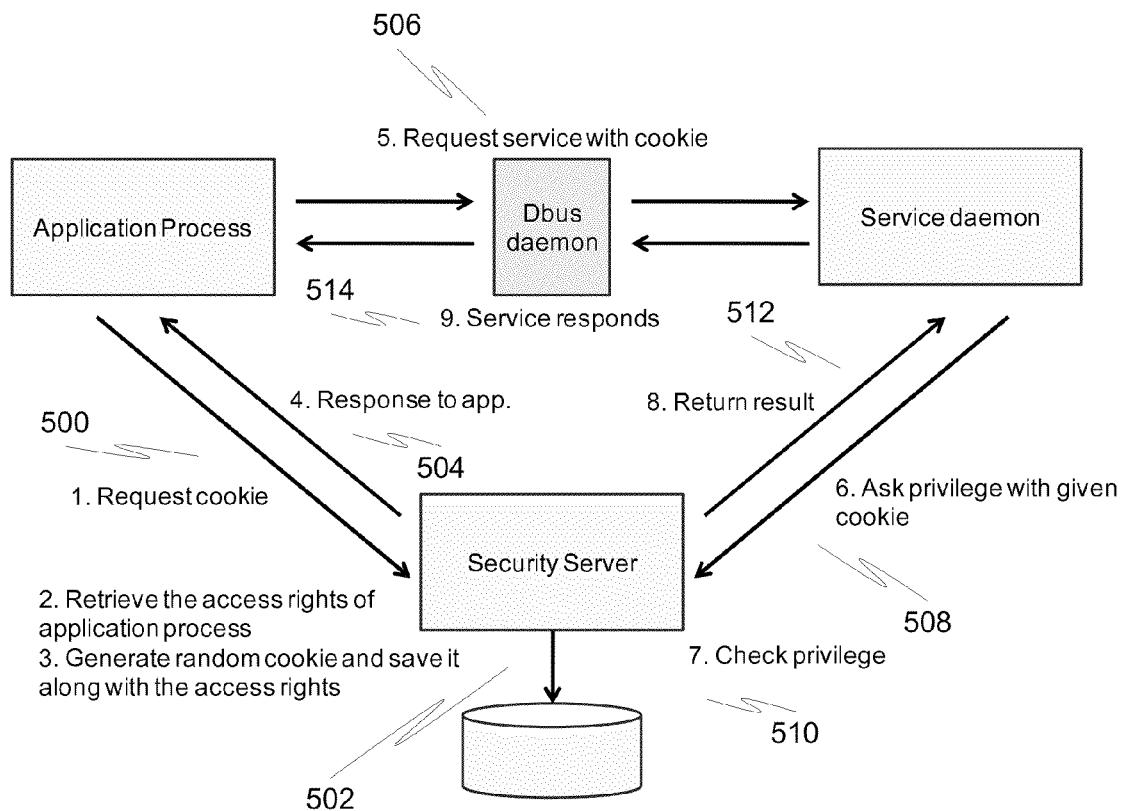
FIG. 5 is an example operation flow in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The present invention is generally directed at improving the security of widget systems and providing protection to the device and other applications from a compromised or malicious widget and/or the process that runs the widget. One solution may involve delegating a set of access control rules from a Web Runtime (WRT) system to a more secure portion of the computer system outside of the user space code of the WRT, thus improving widget security. This solution, however, needs also to address APIs that contain access control enforcement rules, such as WAC APIs.

In an embodiment of the present invention, a multi-process web runtime system with a sandbox mechanism is used to securely run WAC widgets. If allowed and denied permissions were static for each widget, i.e., if all the access right were known or could be determined at installation time, then the solution involving delegating the set of access control rules from the WRT to a more secure portion of the computer system would be enough. However, the added features of session and one-shot prompts permitted by WAC specifications complicate the access control management and sandboxing because the access rights of a widget can change at runtime and there must be a trusted entity on the system to monitor the execution of WAC widgets to detect such changes in the context of their access rights, revise the access control policies accordingly, and enforce the new context.

In the present invention, the WRT is rearchitected using a multi-process model. A management process, called the WRT process, is introduced to be in change of initializing widget processes, adjusting some parts of security configurations, and handling security critical requests from widget processes. Each widget runs in a separate and isolated process. The accesses for this process are controlled by a security server, WRT process, and by the kernel via a combination of DAC and MAC rules, which are configured by the installation manager at installation time and WRT process at launch time and runtime.

During installation of a widget, an installation manager, also known as the package manager, processes a widget's package (including its certificate and manifest file) and then identifies its accesses rights that can be granted at install-time. The installation manager then crafts access control rules for this widget based on the identified rights and passes these rules to the operating system kernel and/or appropriate operating system/framework daemons/services. When this widget is invoked, the WRT process determines which access rights can be granted to this widget at launch time, crafts access control rules and passes them to the operating system kernel and/or appropriate operating system/framework daemons/services. The WRT process then creates or reserves a process for this widget's execution. As a result, the widget executes in a process separate and isolated for the other active widgets. During execution of the widget, security checks and enforcements are delegated to the operating system kernel and other related processes. The WRT process also plays an active role in security controls and configurations at run-time. As such, the system is able to dynamically change which entity is performing the checking of the access control policies based on the API.

Figure 6:
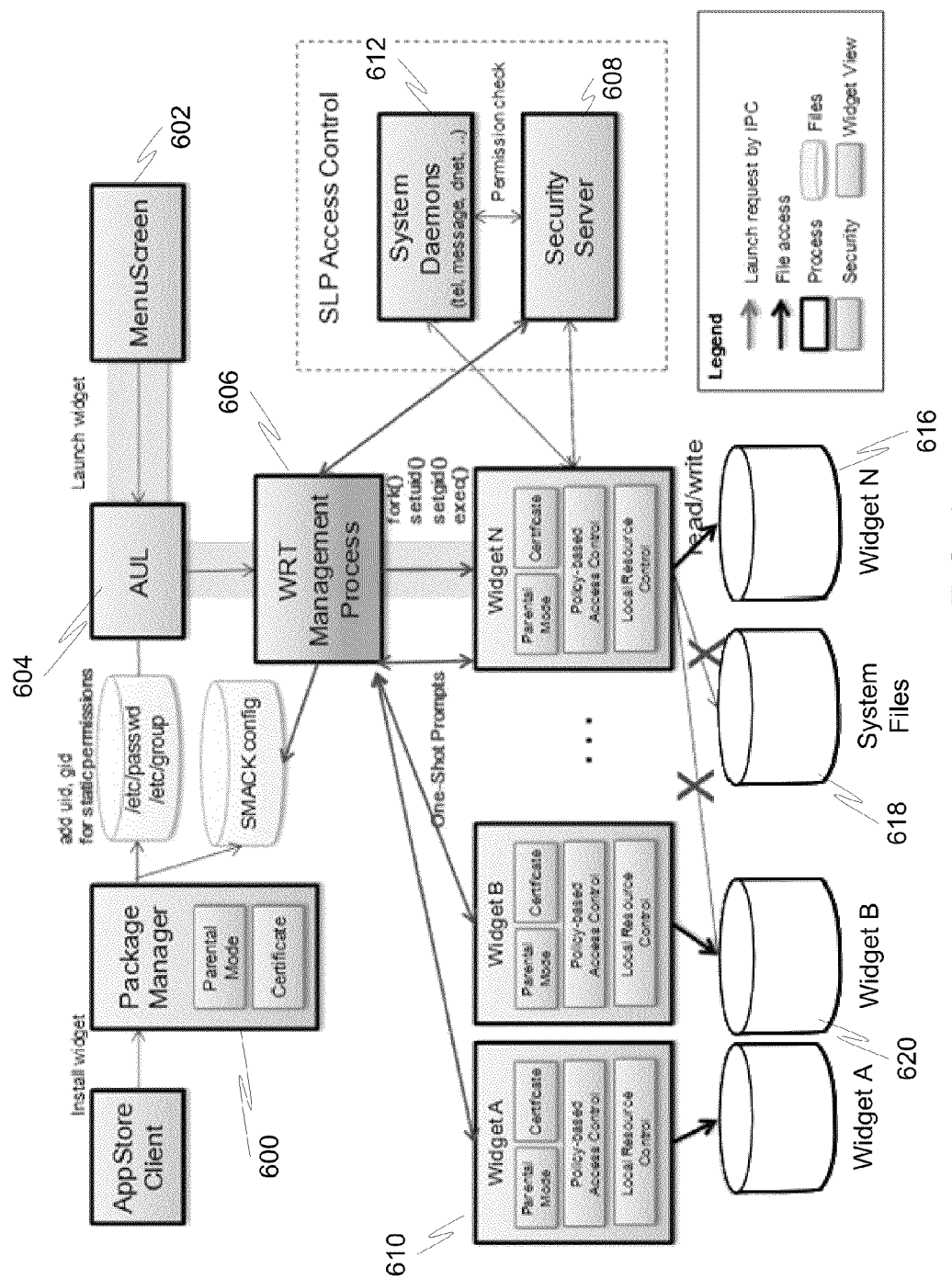
FIG. 6 is a block diagram illustrating a WRT architecture in accordance with an embodiment of the present invention.

FIG. 6 is a block diagram illustrating a WRT architecture in accordance with an embodiment of the present invention. A package manager 600 processes the widget package during installation and identifies which domain the widget belongs to by checking its certificate. The domain of the widget dictates which type of prompt needs to be used for which permission. For permissions that require a blanket prompt, the installation manager prompts the user to get an approval on the requested permissions. Based on the feedback from the user, the installation manager configures the access rules for those permissions that are granted to the widget.

At launch time, a widget is identified through a menu screen 602, which relays the launch request to the AUL 604. AUL 604 then relays the request to the WRT management process 606. The WRT management process 606 identifies whether and which permissions of this widget require session and one-time prompts. For those that require session prompts, the WRT process prompts the user to get the acknowledgement. Based on the feedback from the user, the WRT process configures the access rules for those permissions that are granted to the widget.

At runtime, when a WAC widget is running, the accesses that correspond to all the prompt types, except one-shot, can be handled by the kernel and the security server 608 based on the access control configurations set up by the installation manager and the WRT management process 606. The accesses that correspond to one-shot prompts are handled differently. A widget 610 that requires a one-shot prompt permission sends a request to the WRT management process 606. The WRT management process 606 gets an acknowledgement from the user to identify if the permission is granted. The access controlled by this permission may involve direct accesses to kernel-level objects and/or access to the objects/services from the daemons 612. For the accesses, the security server 608 is involved in the control, the WRT management process 606 communicates with the security server 608 and requests a "one-shot cookie", and then passes it to the requester process. With this one-shot cookie, the widget process 610 can request services from the daemons 612. A one-shot cookie is a special cookie which expires after the widget process consumes the requested service that is controlled by the one-shot prompt permission granted to that widget. For the accesses to the objects controlled by the kernel through MAC and DAC, widget processes send access requests to the WRT management process 606. The WRT management process 606 performs the security checks and if the required permission is granted to the widget, the WRT management process 606 performs the access on behalf of the widget and returns the results back to the requester widget.

As outlined above, the security enforcement and configurations are handled differently depending upon the type of prompt a particular permission requires. For a blanket prompt, the user may be asked for permission grant during installation or the first time the widget is launched. The corresponding access rules (DAC, MAC, etc.) are configured once for this widget and kept using the same configuration for the life-time of the widget. For a session prompt, the user may be asked for permission grant before launching the widget. The new process can then be configured accordingly (e.g., adding it to the corresponding DAC groups, load SMACK rules, etc.) in a forked WRT process. The security server 608 can be contacted for a session token, which is a token that is valid only for the duration of the session. The privileges are then dropped and the widget is executed. The next time the WRT launches the same widget, the dynamic access control configuration is reset from the last session of the widget and the security server is told to revoke the previous session token.

For one-shot prompts, for the resources that require direct access, the widget process 610 sends a request to the WRT management process 606 for the resource. The WRT management process 606 then asks the user to grant the permission. If it is granted then the WRT management process 606 performs the operation on behalf of the widget. For resources that are controlled by the daemons, the widget requests the WRT management process 606 to get a one-shot prompt for a specific permission. The WRT management process 606 asks the user. If the permission is granted, the WRT process gets a one-time token from the security server. The security server 608 validates this token only once so that the widget can consume the requested service of the daemons only once. The next time it wants to access the same service/resource, it needs to initiate another one-shot prompt.

As can be seen from this figure, a particular widget 614 can access a local data store 616 corresponding to itself, but cannot access either system files 618 or local data stores 620 corresponding to other widgets.

Figure 7:
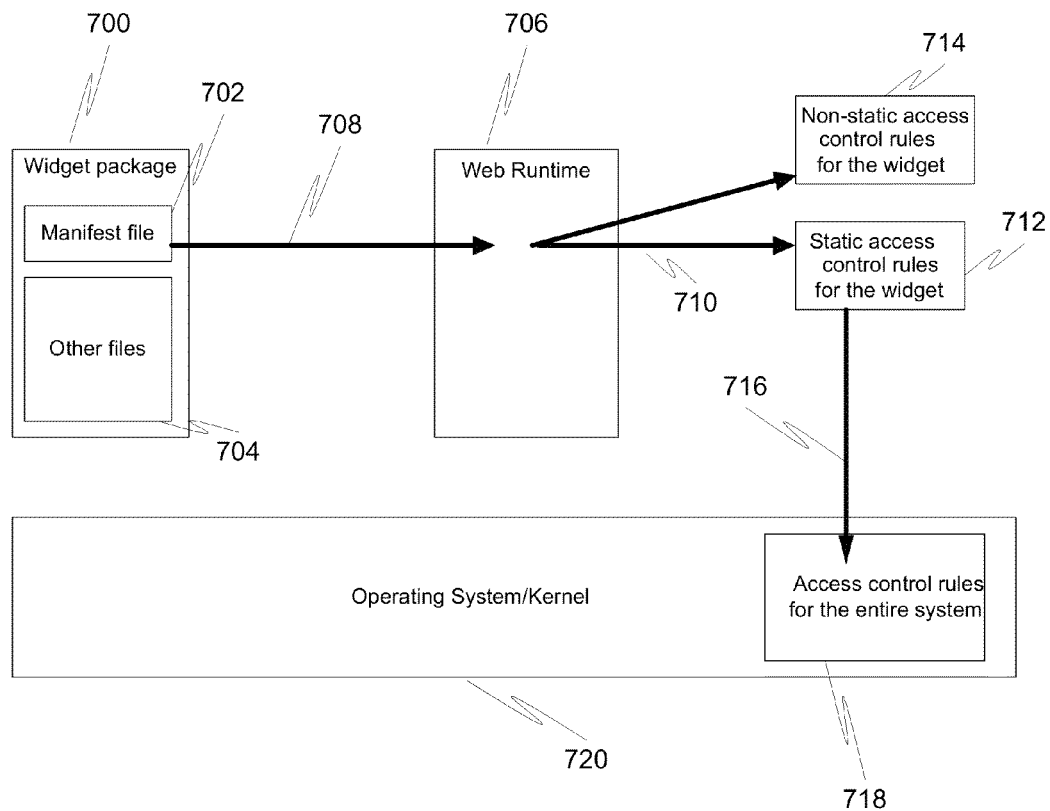
FIG. 7 illustrates a modified Web Runtime system providing widget access rules to a more secure portion of the system, such as an operating system kernel, in accordance with one embodiment of the present invention.

FIG. 7 illustrates an exemplary set of steps for generating security rules during installation of a widget in accordance with an embodiment of the present invention. There are different types of widgets associated with different standards bodies (e.g. W3C widgets, WAC widgets, etc.) and also different widget runtime systems. However, the general security models and access control enforcement principles are similar such that it will be understood that the present invention is applicable to different types of widgets and runtime systems.

A widget is distributed in a widget package 700, which contains a manifest file 702 along with other files 704 like a widget's HTML, CSS files, Javascript™ code, etc. A manifest file contains metadata such as widget's name, author information, configuration information, etc. A manifest file also contains metadata related to access rights required for its widget to operate. For example, if a widget needs to access a network resource, or a device resource like a camera, the manifest file of this widget must specify these resources. As an example of a manifest, consider the following simplified manifest file:

```
<widget id= "http://quirksmoke.org/widget" dockable= "true">
    <widgetname> Test widget</widgetname>
    <icon>pix/myIcon.gif</icon>
    <width>200</width>
    <height>200</height>
    <security>
        <access>
            <host>quirksmode.org</host>
```
-continued
```
        </access>
    </security>
</widget>
```

In the example of the simplified manifest file, the widget manifest file 702 includes a name, identification information, and specifies access rights to a network host. In this example, the widget requires access to a network host "quirksmode.org" as a resource. Then in this example, the access to the specified network host resource is specified using the <security> and <access> tags. Similarly, manifest files may contain access requests to other resources like a camera, personal information such as address book or contact list entries, location information, etc.

As described earlier, during installation of a widget, the WRT module 706 has a management process that processes 708 the widget's package including its manifest file 702 and then identifies and extracts its granted access rights associated with valid access requests. (The WRT module 706 includes at least those components of the total WRT associated with installation of a widget, although it will be understood that the WRT as a whole includes components for both installation and execution of a widget.) Then, the WRT module 706 compiles the list of granted access right for the widget and generates access control rules 710 for this widget based on the identified rights. This can include making a distinction between static access control rules 712 and non-static access control rules 714. Static access control rules are ones that can be determined or evaluated at installation time. Non-static access control rules are then rules that cannot be determined or evaluated until later, i.e. at runtime. The static access control rules 712 for the widget are passed 716 to a more secure portion of the computing system directly or indirectly, such as to the OS/kernel 720 and/or appropriate OS/framework daemons/services. In this example, the static widget access control rules 712 are passed to a region storing access control rules for the entire system 718.

When the widget is invoked, the WRT module 706 creates or reserves a process for its execution. As a result, the widget executes in a process separate and isolated from other active widgets. During execution of the widget, security checks and enforcements are delegated to the more secure portion 720 of the OS kernel and other related processes. In one embodiment, the WRT module 706 does not have to perform the security controls for the types of accesses that it delegated by generating and passing rules to the more secure portion 720 of the kernel and related processes. In another embodiment, the WRT module 706 performs the regular (i.e., conventional) security checks on the widget API calls. Then, another layer of checks is performed by the kernel 720. When a widget access passes the WRT module checks, the WRT module code issues a system call to access the corresponding resource. Then, the kernel 720 performs a check, e.g., a MAC check, on the system call to see if that particular access is allowed. Kernel checks are still based on the rules generated by the WRT module 706 e.g. during installation. In this alternative, the WRT module 706 does not delegate the security checks.

In one implementation Mandatory Access Control (MAC) is used as part of the security decision and enforcement scheme. In general, the rules passed by the WRT module 706 to the kernel can be MAC rules and the kernel can enforce these rules through its MAC mechanisms. This provides greater security assurances compared to conventional widget security approaches.

Many minor variations of the steps illustrated in FIG. 7 may be included depending on implementation details regarding the widget, the OS/kernel, and the security mechanisms used on the platform. As can be seen in FIG. 7, the WRT module 706 processes the widget package 700 during installation and identifies the access requests/needs of the widget. The WRT module 706 compiles the access rights granted to this widget. This process may involve other steps such as checking user preferences, system policies, or prompting the user to get confirmation of the permission granting. Some details of the granted permissions, the granularity of the permissions, etc. differ between different widget systems and are thus implementation-specific.

After the WRT module 706 compiles the list of (or a partial list of) granted permissions for a widget, it generates security rules according to this list. The WRT passes the generated security rules to the kernel. This can happen in various means depending on the specifics of the OS/kernel and the details of the security mechanisms utilized on the platform. For example, the WRT can update a general policy file on the system or issue a system call to dynamically inform the kernel of these security rules. In one embodiment, the WRT module 706 generates MAC rules (such as Security-Enhanced Linux™ (SELinux) or SMACK rules for Linux™ systems, or iptables/Netfilter rules to control network accesses on Linux™) that can be enforced by the kernel while the widget is running.

Referring back to FIG. 7, some differences between the present invention and conventional WRT implementations are now explained. Conventional WRT implementations process widget packages, extract access request from the manifest file, and compile the list of granted access rights for the widget. But, then they store the permission lists in e.g. a database file (as done in SLP WRT) or a file for the WRT to retrieve them later for the WRT to enforce access rules. They do not generate any MAC rules or pass any rules to the kernel. They also fail to distinguish between static and non-static rules, and also fail to handle non-static rules in the manner prescribed by the present invention. At the invocation of a widget, a conventional WRT would read its permission list from the database and handle the security checks and enforcement by itself during the widget execution. In contrast, in the embodiment of FIGS. 6 and 7, the WRT is modified to generate static access control rules in a form that may be passed on to the kernel for the kernel to perform at least some of the security checking conventionally performed by the WRT, and to handle non-static access control rules with the help of a security server. This requires significant modification of conventional WRT system implementations. In the example of having the kernel implement MAC rule to enforce the widget security checks, this requires converting the static access control rules into MAC rules. For example, in one implementation the modifications to the WRT includes:

implementing an algorithm to generate MAC rules from the permission list specific to the requirements of the OS and MAC technology used, which is added to the WRT codebase the algorithm along with code to pass the generated MAC rules to the OS/kernel.

Figure 8:
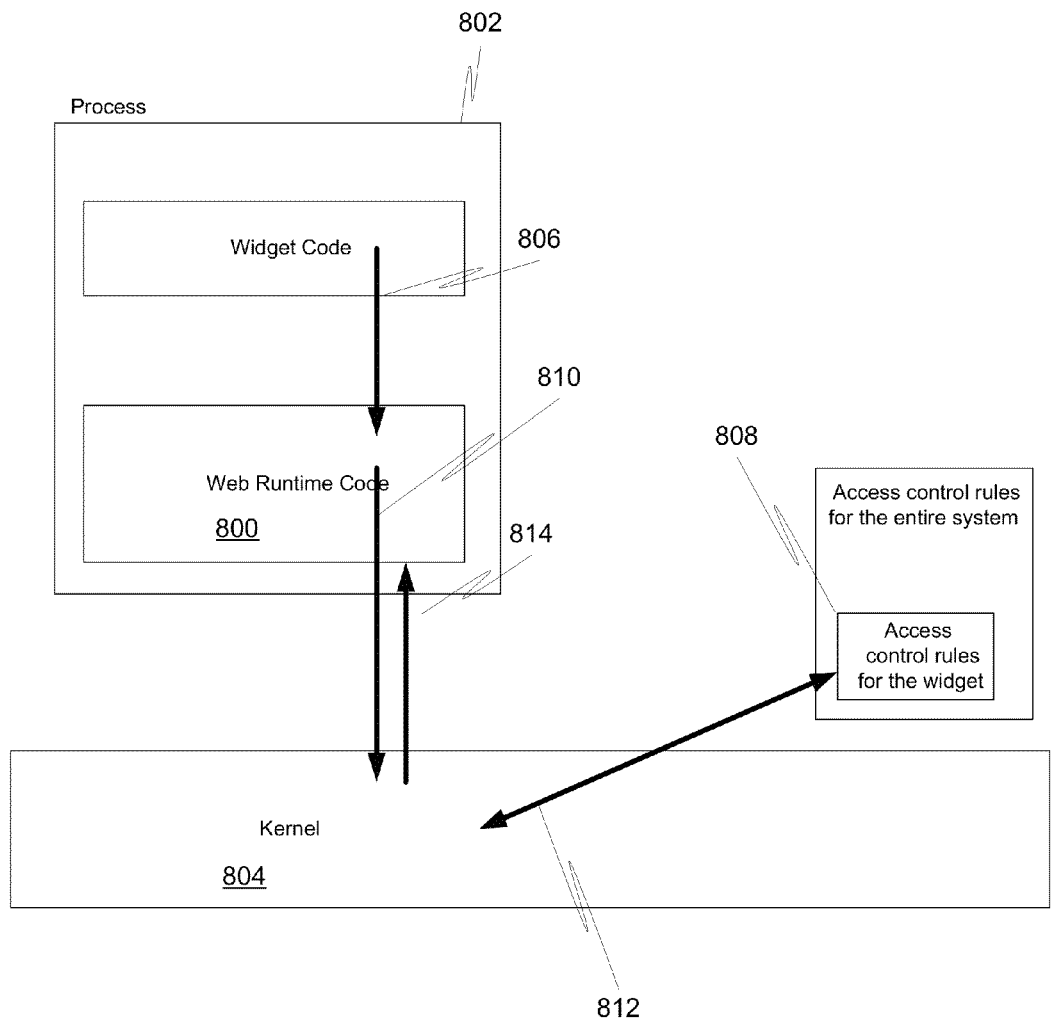
FIG. 8 illustrates delegation of security checking from the Web Runtime to the kernel in accordance with one embodiment of the present invention.

FIG. 8 illustrates an example of general steps for enforcing security rules at runtime for rules that were passed on the OS/kernel. When a widget is invoked, the WRT module 800 executes it in a separate process 802 isolated from other applications and widgets. It would be understood by one of ordinary skill in the art that while there is one WRT, there are different components of the WRT. The WRT module 00 of FIG. 8 includes at least the components of the WRT associated with widget execution. The WRT system management process also configures the security attributes (e.g. SELinux or SMACK labels) of this process 802 accordingly so that the kernel 804 can differentiate the widget that is being run in the process. As illustrated by arrow 806, the widget then tries to access a controlled resource—i.e., a resource is controlled by the kernel via the static access control rules 808 previously generated by the WRT and passed to the system. The WRT module 800 then issues the related system calls to the kernel without performing the security checks, as illustrated by arrow 810. That is, the WRT delegates the security checking of static rules to the OS/kernel 804. The kernel then inspects the system call and checks the widget static access control rules 808, as illustrated by arrow 812. The kernel then makes a decision whether to deny or proceed with the operation. The kernel then returns a result to the WRT module 800, as illustrated by arrow 814. If access is denied, the kernel returns with an error code. If access is allowed, the kernel performs the operation and returns the result. Thus, when the kernel receives a call from the process that executes this widget, it checks the access rules for the widget and inspects the details of the call (e.g., the parameters, the objects that will be affected by the call, etc.) and then it either allows or denies the call.

At invocation of a widget, conventional WRT implementations read their respective permission lists e.g. from a database and handle the security checks and enforcement by themselves during the widget execution. In contrast in the present invention, these security checks and enforcements for static rules are removed from the WRT and the responsibility is delegated to the kernel, while non-static rules are handled by the WRT management process in conjunction with a security server. The WRT does not perform any checks related to the MAC rules already passed to the kernel. Instead, it allows related requests to always go through without blocking them. The actual security controls for these rules are handled by the kernel. This requires modifying an existing WRT to remove these conventional security checks. Moreover, depending on the OS and MAC technology, extra code may need to be added to the WRT to configure the security contexts (e.g. MAC subject labels) of the widget processes just before executing the widgets.

As previously described, the kernel can control the widget accesses through MAC mechanisms. Some exemplary mechanisms will now be discussed, although it will be understood that other mechanisms may also be used. In one embodiment, assume that a widget does not have network access permissions, i.e., its manifest does not specify any requirements to access a network or specifically requests that no network access shall be given. The WRT is programmed to understand when processing this widget's manifest that this widget should be prohibited to access the network. In this example, the WRT assigns a security context (e.g. a SMACK or SELinux label) to this widget (i.e., to the process that will execute the widget) and generates MAC rules to prohibit any network access requests from this widget (or, depending on the MAC system in use, the WRT will not generate any rules to allow network access). The WRT passes this information (the security context+MAC security rules) to the kernel. If the widget tries to access a network resource at runtime, the kernel will receive a system call from this widget's process that requests to access the network. The kernel will check the process's security context and realize that the access should be denied. It will not perform the system call and return an error message to the calling process.

Now assume that a widget does not have permissions to access location information on a platform (e.g., Global Positioning System (GPS) location information). Also, assume that there is a system daemon on this platform that handles the distribution of GPS information. More specifically, only this daemon has access to GPS hardware and all the other processes/applications need to send requests to this daemon to get GPS data. The WRT understands when processing this widget's manifest that this widget should be prohibited to access GPS information. The WRT assigns a security context (e.g. a SMACK or SELinux label) to this widget (i.e., to the process that will execute the widget) and generates MAC rules to prohibit (or, depending on the MAC system in use, the WRT does not generate any rules to allow) this widget to communicate with the GPS daemon (e.g., prohibits an Inter-Process Communication (IPC) between the widget process and the daemon). The WRT passes the information (the security context+MAC security rules) to the kernel. If this widget tries to communicate with the GPS daemon to get location info at runtime, the kernel will receive a system call (e.g. an IPC call) from this widget's process to communicate with the daemon. The kernel will check the security contexts of the widget process and GPS daemon and realize that the access should be denied. It will not perform the system call and return to the process an error message.

On the other hand, in this example if the widget is granted permission to access GPS information, the WRT generates rules to allow the IPC (or does not generate any rule to prohibit it) between the widget process and the GPS daemon. When this widget tries to access the GPS data at runtime, the kernel will receive a system call (e.g. an IPC call) from this widget's process to communicate with the daemon. The kernel will check the security contexts of the widget process and the GPS daemon and realize that the access should be granted. It will proceed with the system call.

In one preferred embodiment, a kernel level Mandatory Access Control is used for security decision and enforcement. In computer security, MAC refers to a type of access control by which the operating system constrains the ability of a subject or initiator (e.g. a process that executes a widget) to access or generally perform some sort of operation on an object or target (e.g. a particular file, network resource, or a hardware component). In practice, a subject is usually a process or thread; objects are constructs such as files, directories, TCP/UDP ports, shared memory segments, etc. Subjects and objects each have a set of security attributes. Whenever a subject attempts to access an object, an authorization rule enforced by the operating system kernel examines these security attributes and decides whether the access can take place. Any operation by any subject on any object will be tested against the set of authorization rules (e.g. a policy) to determine if the operation is allowed.

There are various MAC technologies available in different operating systems. Linux™ has four different main MAC mechanisms—SELinux, Smack, Tomoyo, and AppArmor—implemented in the mainline kernel. Although they are all based on the same or similar principles, their architectures, capabilities, and usage show significant differences.

As previously mentioned, there are many potential variations in the WRT and the OS implementation at a fine level of granularity. Thus, implementation details will determine how much of the security checking can be offloaded to the kernel. Depending on the widget system and OS combination, some widget activities may not translate/map well to the kernel system calls. In such cases, the kernel may not be able to provide fine grained security controls as needed by the widget system. To address this situation, the WRT may be programmed to identify which widget activities can be controlled by the kernel via inspecting system calls and then delegate only that subset of controls to the kernel. If the kernel or OS cannot provide sufficient security controls for some widget activities, then WRT needs to handle those controls that cannot be handled by the OS/kernel. Thus, in principle there are situation where the WRT will provide security checks/controls at a fine level of granularity while the kernel provides security checking at a coarser level of granularity based on what checking can be delegated to the kernel. In such scenarios, several modification can be made to the WRT. This includes having the WRT pass to the OS/kernel those access control rules that correspond to the activities that can be satisfactorily controlled by the OS/kernel. During runtime of the widget, this corresponds to the WRT passing to the kernel/OS, without performing any security checks, only those requests that correspond to the security checking related activities for the widget that can be satisfactorily controlled by OS/kernel. The activities or requests that cannot be satisfactorily controlled by OS/kernel will be handled by WRT itself.

Alternatively, the WRT performs the conventional security checks on the widget API calls, while another layer of checks is performed by the kernel. When a widget access passes the WRT checks, the WRT code issues a system call to access the corresponding resource. Then, the kernel performs a check, e.g., a MAC check, on the system call to see if that particular access is allowed. In this alternative, the WRT does not delegate the security checks.

Figure 9:
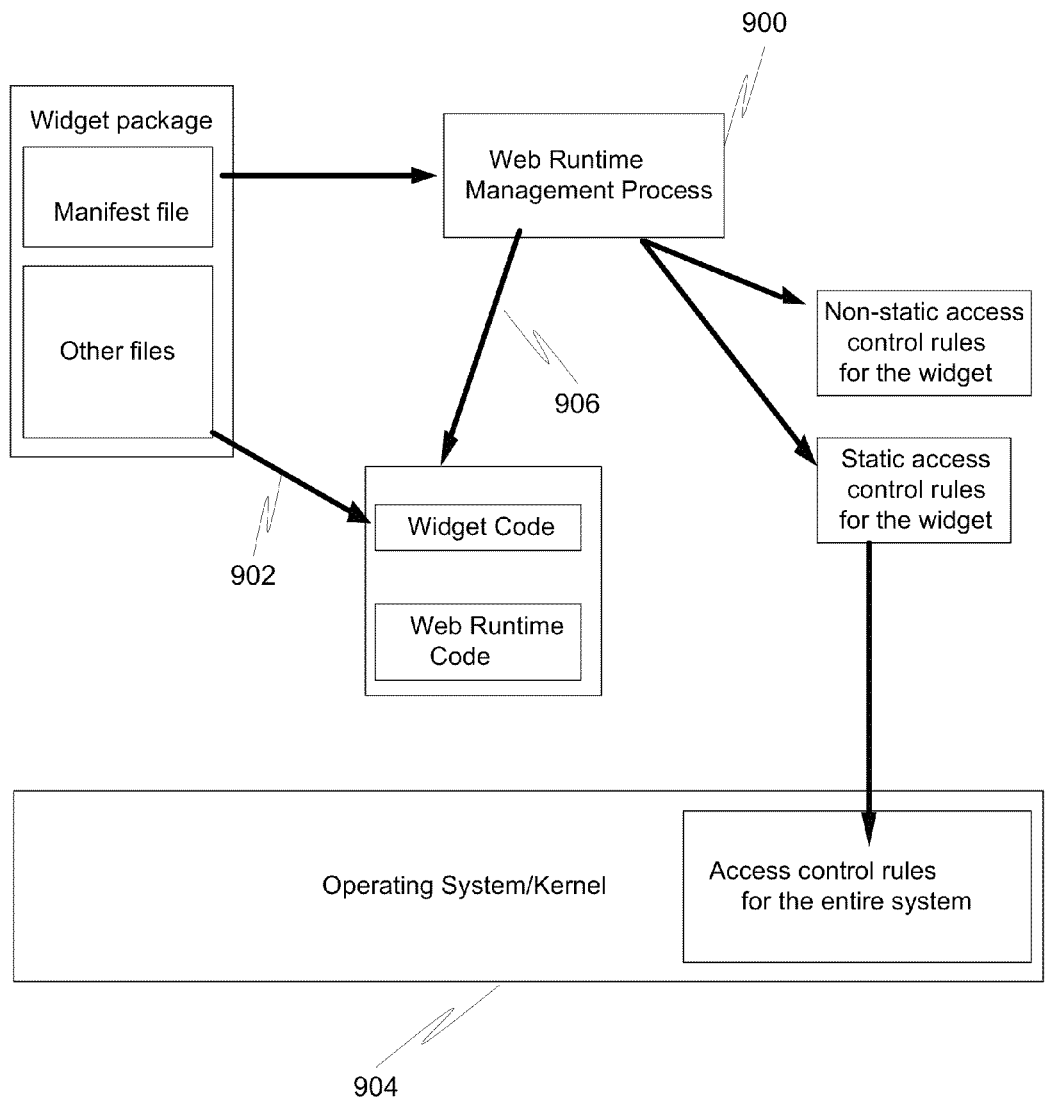
FIG. 9 illustrates a modified Web Runtime system providing widget access rules to a more secure portion of the system, such as an operating system kernel, in accordance with one embodiment of the present invention.

Many variations and various embodiments of the present invention are contemplated. Referring to FIG. 9, in one embodiment the generation of security rules occurs at invocation instead of during installation. For example, the WRT system management process 900 can process the widget package, extract access requests from the manifest file as indicated by arrow 902. The WRT can then generate the rules and pass them to the OS 904 just before starting to execute a widget when the user wants to invoke it. The primary difference over the example of FIG. 7 is illustrated by arrow 906, which illustrates that the management process created a new process to run the widget and also the widget code and data is retrieved from the new process and widget execution starts.

In another embodiment, the WRT can delegate the rule generation to another entity (e.g. an OS service or process). In this embodiment the WRT can pass the manifest file and other related information to this entity, which handles the rule generation and updating the policies (i.e., passing the rules to the kernel).

Figure 10:
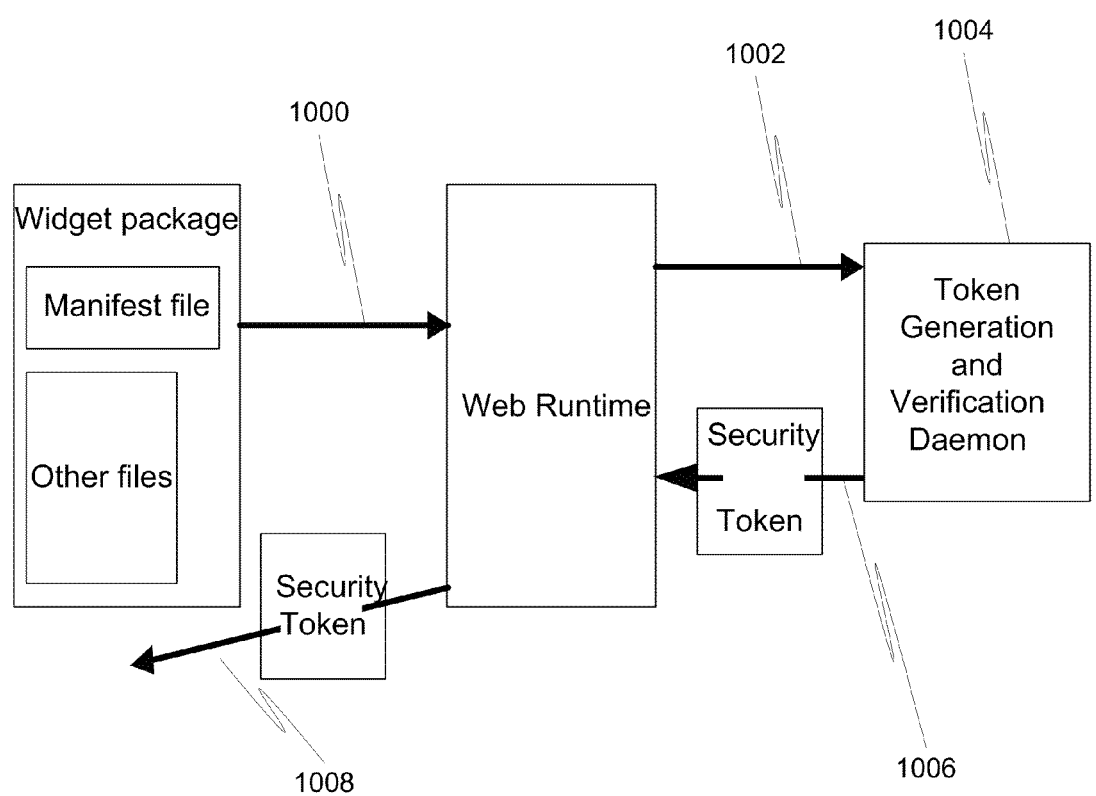
FIG. 10 illustrates using security tokens to enforce widget security in accordance with an embodiment of the present invention.
Figure 11:
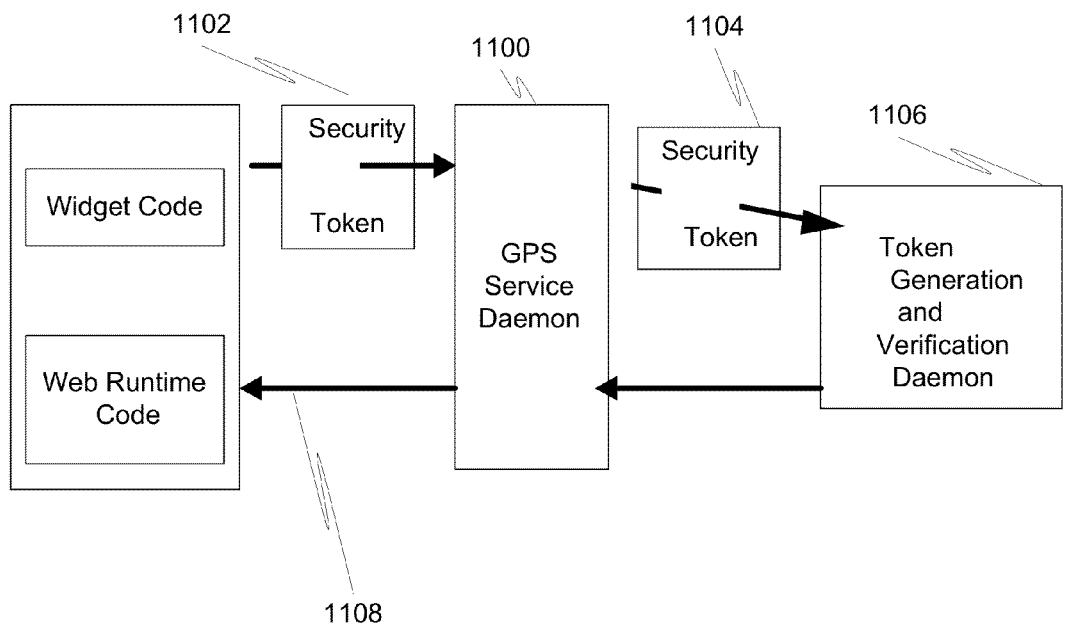
FIG. 11 illustrates an example of using security tokens to perform a security check for a location service request of a widget in accordance with one embodiment of the present invention.

As previously described, in a preferred embodiment, the security enforcement is handled via MAC mechanisms by the kernel to eliminate the security weakness of the WRT performing security checks. However, other arrangements are possible in which a more secure portion of the computer system handles the security checking of the widget, such as by using OS daemons and/or security tokens. Alternative embodiments can realize this in various different ways as illustrated in FIGS. 10 and 11. Security checks and enforcements can rely on security tokens. Each widget can have a security token that shows its access rights.

As illustrated in FIG. 10, during installation or at invocation, the WRT processes the widget package and extracts the access request form the manifest file, as indicated by arrow 1000. The WRT then compiles the list of granted access rights for the widget and also requests a security token for the granted rights, as indicated by arrow 1002, form a token generation and verification daemon 1004. The daemon generates an appropriate security token and passes it back to the WRT as indicated by arrow 1006. The WRT then stores the security token for later use as indicated by arrow 1008.

Such a token needs to be generated by a trusted party (e.g. WRT or a system daemon), protected from tampering by untrusted parties (e.g. widget), authentic and verifiable, and allows other entities (e.g. system services) to check the access rights of the widget.

FIG. 11 is an illustrative use example where a security token has been previously stored by a WRT. Assume that a platform uses token-based security framework and also has various system or OS framework daemons for accessing e.g. GPS, sensors, etc. A widget running on this platform wants to access GPS data. The WRT request access to GPS data and attaches its security token to the request to a GPS service daemon 1100, as illustrated by arrow 1102. The GPS daemon 1100 receives the request and checks the security token. This may includes sending the token (arrow 1104) to the token generation and verification daemon 1106 to check if the widget requires rights to access the requested data. The token generation and verification daemon 1106 checks the received token to determine if the widget can be granted access and returns an allow/deny decision back to the GPS daemon 1100. The GPS service daemon 1100 returns a message as indicated by arrow 1108. If this widget has permission to access GPS data (as indicated in its security token), the GPS service daemon 1100 fulfills the request and returns the requested result. Otherwise, the GPS service daemon refuses to perform the request and sends back an error message.

Figure 12:
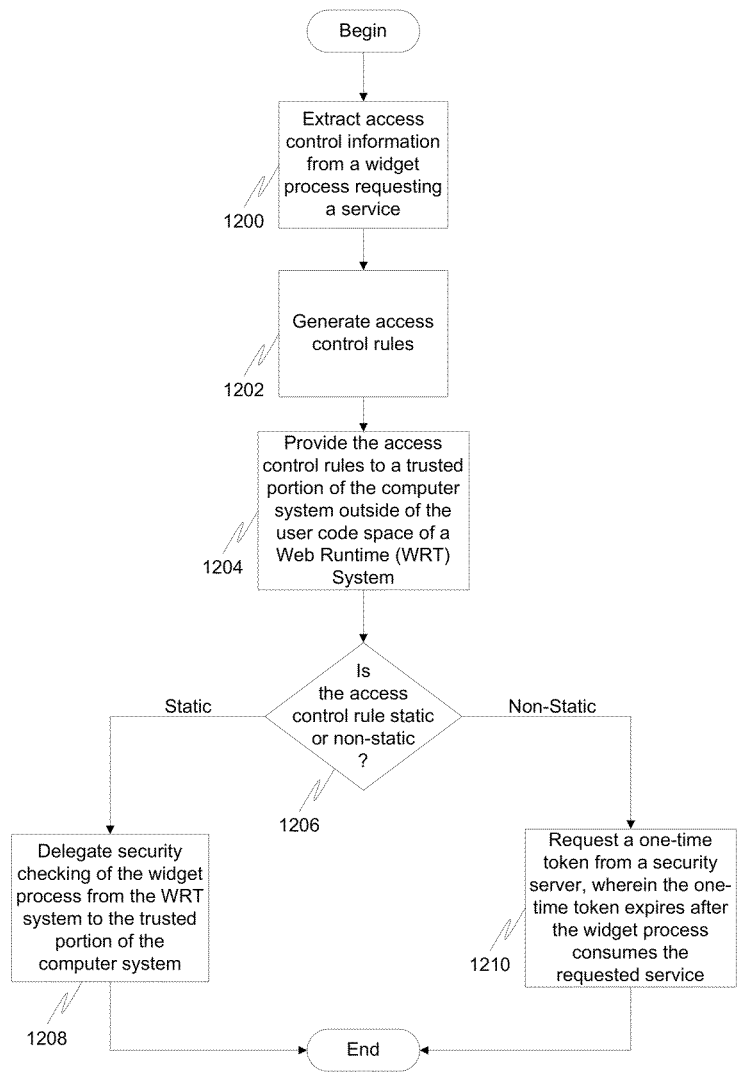
FIG. 12 is a flow diagram illustrating a method for providing security enforcements of widgets in accordance with an embodiment of the present invention.

FIG. 12 is a flow diagram illustrating a method for providing security enforcements of widgets in accordance with an embodiment of the present invention. At 1200, access control information can be extracted from a widget process requesting a service. At 1202, access control rules can be generated. At 1204, the access control rules can be provided to a trusted portion of the computer system outside of the user code space of a WRT system. Then, 1206-1210 can be run for each access control rule as it is encountered. At 1206, it can be determined if the access control rule is static or non-static. If it is static, then at 1208 security checking of the widget process can be delegated from the WRT system to the trusted portion of the computer system. If it is non-static, then at 1210 a one-time token can be requested for a security server, wherein the one-time token expires after the widget process consumes the requested service.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method of providing security enforcements of widgets in a computer system having a processor and a memory, comprising:
    extracting access control information from a widget process requesting a service, generating one or more access control rules customized for the widget process, and providing the access control rules to a trusted portion of the computer system outside of a user code space of a Web Runtime (WRT) system; and
    for any static access control rule, delegating security checking of the widget process from the WRT system to the trusted portion of the computer system, wherein the trusted portion of the computer system uses the access control rules for security checking of the widget process, and wherein the WRT system is modified to generate one or more static access control rules and convert the static access control rules into a form that is compatible with the trusted portion of the computer system based on system requirements and type of technology used by the trusted portion of the computer system,
    the WRT system is configured to dynamically adjust, based on a particular access control rule, which one of the WRT system and the trusted portion of the computer system performs security checking of the widget process.

2. The method of claim 1, further comprising
    for any non-static access control rule:
        requesting a one-time token from a security server external to the WRT system, wherein the one-time token expires after the widget process consumes the requested service; and
        wherein the one-time token is used by the widget process to access the service.

3. The method of claim 2, wherein a non-static access control rules includes one of the following:
    a session prompt; and
    a one-shot prompt.

4. The method of claim 2, wherein for any non-static access control rule that is a session prompt, the method further comprises:
    requesting permission from a user prior to launching the widget process;
    dropping privileges of the WRT system; and
    resetting dynamic access control configuration of the widget process and requesting that the security server revoke the one-time token upon next launch of the widget process.

5. The method of claim 2, wherein for any non-static access control rule that is a one-time prompt, the method further comprises:
    requesting permission from a user when the widget process requests the service;
    requesting that the security server honor the one-time token only a single time.

6. The method of claim 1, wherein a static access control rule includes one of the following:
   a blanket prompt;
   a permit prompt; and
   a deny prompt.

7. The method of claim 1, wherein the trusted portion of the computer system is an operating system kernel.

8. The method of claim 7, wherein the static access control rules are converted to mandatory access control rules enforced by the operating system kernel.

9. The method of claim 7, wherein the extracting, generating, and providing are performed by a WRT management process.

10. The method of claim 7, wherein the operating system kernel dynamically receives updated access control rules from the WRT system.

11. The method of claim 1, wherein the security server is a part of Service Location Protocol (SLP) Access Control.

12. The method of claim 1, wherein the access control information comprises access restrictions for the widget process.

13. The method of claim 1, wherein the system requirements comprises operating system requirements, and wherein the type of technology used by the trusted portion comprises mandatory access control (MAC) technology.

14. The method of claim 13, wherein modifying the WRT system comprises:
   generating one or more MAC rules from a permission list specific to requirements of the operating system and MAC technology used, and passing the generated MAC rules to the trusted portion that comprises an operating system kernel.

15. A method of providing security enforcements of widgets in a computer system having a processor and a memory, comprising:
   extracting access control information from a widget process requesting a service, generating one or more access control rules customized for the widget process, and providing the access control rules to a trusted portion of the computer system outside of the user code space of a Web Runtime (WRT) system; and
   for any static access control rule, delegating some but not all security checking of the widget process from the WRT system to the trusted portion of the computer system, such that two levels of security checking are performed, one by the WRT system and one by the trusted portion of the computer system, wherein the trusted portion of the computer system uses the access control rules for security checking of the widget process, and wherein the WRT system is modified to generate one or more static access control rules and convert the static access control rules into a form that is compatible with the trusted portion of the computer system based on system requirements and type of technology used by the trusted portion of the computer system,
   wherein the WRT system is configured to dynamically adjust, based on a particular access control rule, which one of the WRT system and the trusted portion of the computer system performs security checking of the widget process.

16. The method of claim 15, wherein the trusted portion of the computer system is an operating system kernel.

17. The method of claim 16, wherein the static access control rules are converted to mandatory access control rules enforced by the operating system kernel.

18. A computer system having improved widget security, comprising:
   a processor;
   a memory;
   an operating system; and
   a Web Runtime (WRT) system supporting installation and invocation of widgets, wherein the WRT system is configured to:
      receive a widget manifest from each installed widget;
      based on at least one widget manifest received, determine one or more access control rules delegable from the WRT system to a more secure portion of the computer system associated with the operating system; and
      pass a set of delegable static access control rules to the more secure portion of the computer system to perform security checking;
      wherein each widget manifest comprises access restrictions for an associated installed widget;
      wherein the WRT system is modified to generate the set of delegable static access control rules and convert the set of delegable static access control rules into a form compatible with the more secure portion of the computer system based on system requirements and type of technology used by the more secure portion of the computer system; and
      wherein the WRT system is configured to dynamically adjust, based on a particular access control rule, which one of the WRT system and the more secure portion of the computer system performs security checking.

19. The computer system of claim 18, wherein:
   the WRT system includes a WRT management process that is configured to communicate with a security server to obtain one-time tokens for any non-static access control rule.

20. The computer system of claim 19, wherein the WRT management process is further configured to communicate with the security server when an installed widget is invoked for any non-static access control rules that are session prompts.

21. The computer system of claim 18, wherein the WRT system is configured to pass the set of delegable static access control rules to the more secure portion of the computer system when an installed widget is invoked.

22. The computer system of claim 21, wherein the WRT management process is further configured to communicate with the security server when an installed widget requests a particular service for any non-static access control rule that is a one-time prompt linked to the particular service.

23. The computer system of claim 18, wherein the more secure portion of the computer system comprises a trusted portion, and wherein the trusted portion is an operating system kernel.

24. The system of claim 23, wherein upon an installed widget being invoked, the WRT system determines access restrictions grantable to the invoked widget at launch time, generates one or more access control rules, and passes the access control rules to the operating system kernel for security checking of executing widgets.

25. The system of claim 18, wherein the access restrictions for an associated installed widget are grantable at install-time.

26. A system comprising:
   a plurality of widgets;
   a WRT management process;
   a security server; and
   an operating system kernel;
   wherein the WRT management process:

extracts access control information from the widgets, generate one or more access control rules, and provides the access control rules to the operating system kernel; and for any static access control rule, delegates at least some security checking of a widget process to the operating system kernel, wherein the operating system kernel uses the access control rules for security checking of the widget process, and wherein the WRT management process is modified to generate one or more static access control rules and convert the static access control rules into a form that is compatible with the operating system kernel based on system requirements and type of technology used by the operating system kernel, wherein the WRT management process is associated with a WRT system, and the WRT system is configured to dynamically adjust, based on a particular access control rule, which one of the WRT system and the operating system kernel performs security checking.

27. A program storage device readable by a machine tangibly embodying a program of instructions executable by the machine to perform a method providing security enforcements of widgets in a computer system having a processor and a memory, the method comprising:

extracting access control information from a widget process requesting a service, generating one or more access control rules customized for the widget process, and providing the access control rules to a trusted portion of the computer system outside of a user code space of a Web Runtime (WRT) system; and for any static access control rule, delegating security checking of the widget process from the WRT system to the trusted portion of the computer system, wherein the trusted portion of the computer system uses the access control rules for security checking of the widget process, and wherein the WRT system is modified to generate one or more static access control rules and convert the static access control rules into a form that is compatible with the trusted portion of the computer system based on system requirements and type of technology used by the trusted portion of the computer system, wherein the WRT system is configured to dynamically adjust, based on a particular access control rule, which one of the WRT system and the trusted portion of the computer system performs security checking.

* * * * *